Patented June 17, 1952

2,600,655

UNITED STATES PATENT OFFICE 2,600,655

CHROMIUM OXIDE-TUNGSTEN OXIDE-IRON OXIDE GEL CATALYST

Edward C. Jacobs, San Mateo, Calif., and Lester G. Lundsted, Grosse Ile, Mich., assignors to Wyandotte Chemicals Corporation, Wyandotte, Mich., a corporation of Michigan No Drawing. Original application July 23, 1949, Serial No. 106,505. Divided and this application August 30, 1951, Serial No. 247,189

2 Claims. (Cl. 252—470)

The present application is a division of our co-pending application, Serial No. 106,505 filed July 23, 1949, which in turn is a division of our co-pending application Serial No. 733,976, Patent No. 2,503,050, filed March 11, 1947. This invention relates to a chromic oxide complex catalyst composition which is particularly suited for the aldehydoisomerization of alkylene alpha oxides.

In the co-pending U. S. patent application Serial No. 588,710, now U. S. Patent No. 2,479,632, filed April 16, 1945 by Lester G. Lundsted, Edward J. Schwoegler and Edward C. Jacobs, said Lundsted and Jacobs being co-applicants herein, it is disclosed that a chromic oxide gel catalyst (prepared as described in Vol. 63, p. 1129 of the Journal of the American Chemical Society) effects the isomerization of propylene oxide to allyl alcohol, propionaldehyde being the minor and lesser-proportion product. In other words, in the aforesaid co-pending application, the employment of the chromic oxide gel catalyst alone produced an alkylene oxide isomerization in which the ratio of allyl alcohol to the propionaldehyde was on the order of 3 to 1. We have now discovered, that by the incorporation of oxides of tungsten and iron, this relationship can be reversed; and even to the point where, in the case of propylene oxide, there is practically no allyl alcohol and the propionaldehyde constitutes over 90% of the conversion products. The isomerization process and catalyst composition of our invention also results in exceptionally high and favorable conversion percentages.

The catalyst compositions of our invention are also particularly useful and advantageous in that they possess relatively long lives of activity; and upon regeneration treatment, have the ability of resuming or recapturing an activity paramount to that of the originally prepared catalyst composition.

Briefly outlined, our invention comprises a catalyst composition consisting of a dried or dehydrated chromic oxide gel to which there has been added tungsten oxide and iron oxide. Tungsten oxide and iron oxide, just as in the case of the parent chromic oxide (called "chromium oxide" by Turkevich et al. in their aforesaid publication in the Journal of the American Chemical Society, Vol. 63, p. 1129) are present as a derivative of a soluble Cr-, W-, or Fe-, salt or oxy-acid subsequently converted to the precipitated metallic oxide by treatment with ammonium hydroxide.

Preferably, the proportions of the above-named metallic compound ingredients of our gel catalyst composition, are found to fall in certain specified ranges. The determination of the proportion of these compounds is conveniently based upon a calculation of the chemically equivalent weights of the corresponding metallic compounds employed in the synthesis of the catalyst compositions, and thence reduced to simplified or empirical chemical formulas, such as $Cr_2O_3$, $WO_3$ and $Fe_2O_3$; and even though the actual chemical structure of the metallic compound components of the catalyst compositions is presently unknown, escaping precise chemical analysis. Thus, the preferred range of proportions of these ingredients is as follows: $Cr_2O_3$, 40–70% by weight; $WO_3$, 15–50%; and $Fe_2O_3$, 1–3%.

The catalyst of our invention need not be admixed with, supported upon, or carried by a so-called "catalyst carrier," but is placed directly in a furnace or heating chamber (preferably mounted in a vertical position) with externally applied heat, and the vaporized or gaseous alkylene oxide then passed over and through the heated catalyst.

The following examples further illustrate our invention.

EXAMPLE 1

In this example, the compounds added to the parent chromic oxide gel catalyst, were tungsten oxide and iron oxide. The preparation was as follows:

Nine hundred grams of $Cr(NO_3)_3 \cdot 9H_2O$, 10 grams of ferric ammonium oxalate and 300 grams ammonium acetate were dissolved in 3 liters of distilled water and the mixture stirred, heated to boiling and then permitted to cool. On cooling, an ammoniacal solution of tungstic acid containing 70 grams of $WO_3 \cdot H_2O$, 816 cc. of concentrated ammonium hydroxide (28% $NH_3$ content) and 2.2 liters of distilled water was added, the solution being stirred for 1 minute with subsequent gelation. The resultant gel was baked for 48 hours at 50° C. and washed with distilled water to remove $NO_3$ ions. One hundred grams of tungstic acid, dissolved in concentrated ammonium hydroxide were then added to the washed gel and the resultant composition baked to dryness in an oven at 240° C.

The composition of the resultant catalyst was calculated to be:

$Cr_2O_3$, 51 mols or 49.6% by weight
$WO_3$, 33.3 mols or 49.4% by weight
$Fe_2O_3$, 1 mol or 1.0% by weight Propylene alpha oxide was passed over this catalyst at a temperature of 350° C. and at a space velocity of 95 grams per hour per liter of catalyst. The conversion, on the basis of the total amount of propylene alpha oxide fed through the heated catalyst chamber was 36% to propionaldehyde (based on carbonyl analysis), 6% to unsaturates, as allyl alcohol.

EXAMPLE 2

In the catalyst composition employed in this example, the relative proportions of tungsten oxide and iron oxide added to the parent chromic oxide gel, were reduced. The preparation of the catalyst composition was similar to that previously described in Example 1. The resultant composition, on a calculated basis, contained:

$Cr_2O_3$, 51 mols or 69.7% by weight
$WO_3$, 13.7 mols or 28.7% by weight
$Fe_2O_3$, 1 mol or 1.6% by weight On passing propylene alpha oxide over the above catalyst at a temperature of 350° C. and at a space velocity of 110 grams per hour per liter of catalyst, the furnace products were found to contain 63% propionaldehyde and 17% unsaturates.

EXAMPLE 3

In the catalyst composition employed in this example the same catalyst of Example 1 was used except that after baking to dryness in an oven at 240° C., the dried gel was subsequently heated to a temperature of 1000°–1200° C. Ninety cc. of the resultant heated catalyst (i. e. 51 mols $Cr_2O_3$, 33.3 mols $WO_3$ and 1 mol $Fe_2O_3$) were placed in the tubular furnace. Propylene alpha oxide passed over this catalyst composition at a temperature of 214°–292° C. (temperature readings taken at increments of 1 inch apart through a 6½ inch depth of catalyst bed), and at a space velocity of 708 grams per hour per liter of catalyst. After so passing the vaporized propylene alpha oxide over the heated catalyst for a period of 4 hours and 20 minutes, the following results were obtained: 66.3% conversion of propylene alpha oxide fed of which conversion products 86.8% was propionaldehyde and 7.35% was unsaturates; or on the basis of per cent of furnace products 57.5% propionaldehyde and 4.8% unsaturates.

EXAMPLE 4

In the catalyst composition employed in this example, the proportions of tungsten oxide and iron oxide were increased. This catalyst was prepared as follows:

A mixture of 450 grams of $Cr(NO_3)_3.9H_2O$, 150 grams of ammonium acetate and 33.9 grams of $Fe(NO_3)_3.9H_2O$ were dissolved in 1½ liters of water, heated to the boiling point and cooled; whereupon 413 cc. of concentrated ammonium hydroxide (28% $NH_3$ content) were added, forming a gel. The resultant gel was baked in an oven at 58° C. for 48 hours, then washed free of nitrate ions, drained and a solution of 40 grams of tungstic acid in 150 cc. concentrated ammonium hydroxide solution was stirred in. The resultant mixture was then baked at 250° C. for approximately 96 hours, producing a hard, black product, which was thereafter heated to 450° C. for 3 hours.

The resultant catalyst composition contained the following (calculated basis):

$Cr_2O_3$, 13.2 mols or 67.8% by weight
$WO_3$, 3.8 mols or 29.4% by weight
$Fe_2O_3$, 1 mol or 2.8% by weight On passing propylene alpha oxide over the above described catalyst composition at a temperature of 350° C. and at a space velocity of 296 grams per hour per liter of catalyst, the furnace products contained 55.6% propionaldehyde and 8.7% unsaturates.

For the purpose of summarizing the foregoing Examples 1–4 inclusive the following table is given showing the respective amounts of catalyst composition ingredients, and the per cent of the propionaldehyde (based on carbonyl analysis) and of unsaturates, as allyl alcohol, of the furnace products.

From this table, it will be seen that the propionaldehyde constitutes the major and predominant product in each case, with the unsaturates (analyzed as allyl alcohol) being in a minor proportion. In the majority of cases the ratio of the propionaldehyde to unsaturates (cf. Examples 1, 2 and 4), is 6 to 1 or greater. It will also be seen that the percentage proportions of catalyst constituents confirm the preferred range of proportions stated at the outset of this description.

*Table*

| Constituents | Example 1 | | Example 2 | | Example 3 | | Example 4 | |
|---|---|---|---|---|---|---|---|---|
| | Mol Ratio | Per Cent by Weight | Mol Ratio | Per Cent by Weight | Mol Ratio | Per Cent by Weight | Mol Ratio | Per Cent by Weight |
| $Cr_2O_3$ | 51 | 49.6 | 51.0 | 69.7 | 51 | 49.6 | 13.2 | 67.8 |
| $WO_3$ | 33.3 | 49.4 | 13.7 | 28.7 | 33.3 | 49.4 | 3.8 | 29.4 |
| $Fe_2O_3$ | 1.0 | 1.0 | 1.0 | 1.6 | 1.0 | 1.6 | 1.0 | 2.8 |
| PER CENT OF FURNACE PRODUCTS | | | | | | | | |
| Propionaldehyde | | 36.0 | | 63.0 | | 57.5 | | 55.6 |
| Unsaturates | | 6.0 | | 17.0 | | 4.8 | | 8.7 |

Other modes of applying the principle of our invention may be employed, changes being made as regards to the details described, provided the features stated in any of the following claims or the equivalent of such be employed.

We, therefore, particularly point out and distinctly claim as our invention:

1. A chromic oxide complex catalyst composition consisting of a washed and dried aqueous ammoniacal gel consisting of a mixture of chromic oxide, tungsten oxide and iron oxide wherein these ingredients are present in the mol ratios of 13.2–51.0 mols chromic oxide, 3.8–33.3 mols tungsten oxide and approximately 1 mol of iron oxide.

2. A chromic oxide complex catalyst composition consisting of a washed and dried aqueous ammoniacal gel consisting of a mixture of chromic oxide, tungsten oxide and iron oxide present in the mol ratios of 13.2–51.0 mols of chromic oxide, 3.8–33.3 mols of tungsten oxide and approximately 1 mol of iron oxide, said dried and heated gel being subsequently heated at a temperature of above 1000° C.

EDWARD C. JACOBS.
LESTER G. LUNDSTED.

No references cited.